March 31, 1964 G. A. LARSON ETAL 3,126,639
DEVICE FOR DETERMINING THE MEAN HEIGHT OF A WAVEFORM
Filed April 4, 1962
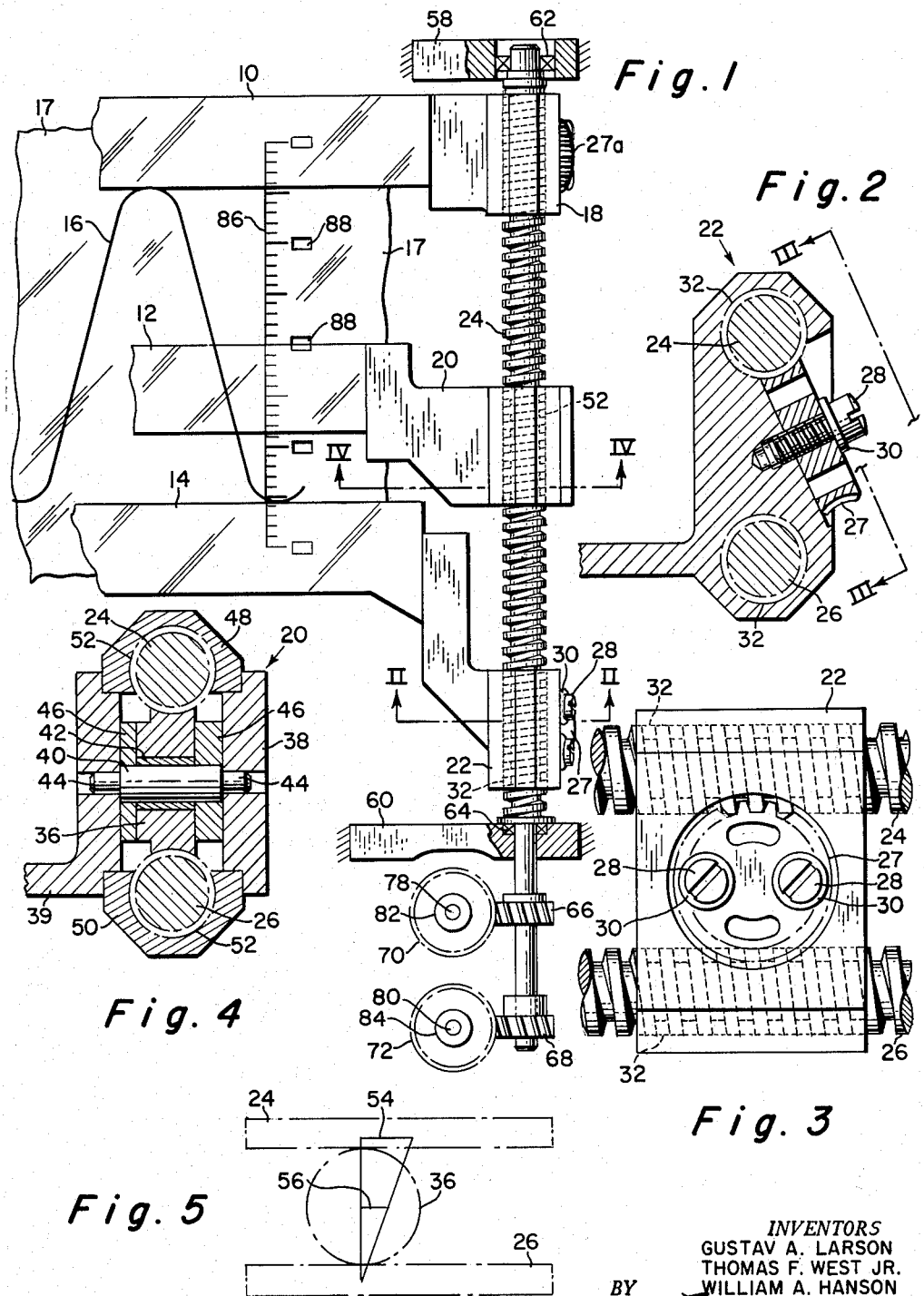
INVENTORS
GUSTAV A. LARSON
THOMAS F. WEST JR.
BY WILLIAM A. HANSON
ATTORNEYS United States Patent Office 3,126,639
Patented Mar. 31, 1964

3,126,639
DEVICE FOR DETERMINING THE MEAN HEIGHT OF A WAVEFORM
Gustav A. Larson and Thomas F. West, Jr., Baltimore, and William A. Hanson, Severna Park, Md., assignors, by mesne assignments, to the United States of America as represented by the Secretary of the Navy
Filed Apr. 4, 1962, Ser. No. 185,783
5 Claims. (Cl. 33—143)

The present invention relates to a device for determining the mean height of a waveform and more particularly to a device for determining the mean height of a waveform when indicators thereof are aligned with the top and the bottom of the waveform.

It has become increasingly important that submarines determine their depth with respect to the mean height of the waves at the surface of the water. Accordingly, in the control room of the submarine a display has been provided for indicating a waveform of the waves at the surface of the water above the submarine and various instruments have been used with the display to determine the mean height of this waveform. In the past these instruments have been difficult to operate since a series of adjustments had to be made before the mean wave height was indicated. One such instrument has been three indicators mounted on a single carriage with a top and bottom indicator adjustable from a middle indicator by a gearing arrangement. This instrument required the top and bottom indicators to be spaced from one another approximately at the total height of the waveform and then the entire carriage was moved along a track until the indicators were aligned with the top and bottom of the waveform, at which time the top and bottom indicators would again have to be adjusted for the height of the waveform and so on until the operator was reasonably assured that the instrument was in its proper position. The present invention greatly simplifies the determination of the mean height of the waveform in that a top indicator is aligned with the top of the waveform and a bottom indicator is separately aligned with the bottom of the waveform whereupon a middle indicator will then automatically indicate the mean height of the waveform, thus requiring merely two alignments in order to give the desired result. This is accomplished by driving the top and the bottom indicators by a respective worm gear and by providing a differential arrangement for the middle indicator which is a worm gear responsive to the movement of both of the worms. Accordingly, as either of the top or bottom indicators are moved for alignment purposes the middle indicator will follow the same direction as the movement of either indicator but only at half the speed because of the walking effect of the worm gear upon the worms.

An object of the present invention is to provide a device which will automatically determine the center between any two given points.

Another object is to provide a device which will automatically indicate the mean height of a waveform.

A further object of the invention is to provide a device which will automatically indicate the mean height of the waveform upon separate alignment of one indicator with the top of the waveform and another indicator with the bottom of the waveform.

Other objects and many of the attendant advantages of this invention will be readily appreciated as the same becomes better understood by reference to the following detailed description when considered in connection with the accompanying drawings in which like reference numerals designate like parts throughout the figures thereof and wherein;

FIG. 1 shows a plan view of the invention and the waveform with a portion of the indicators and display cut away.

FIG. 2 shows a cross section of FIG. 1 taken along line II—II.

FIG. 3 is a view taken along line III—III of FIG. 2.

FIG. 4 is a cross section taken along line IV—IV of FIG. 1.

FIG. 5 is a diagrammatic illustration of a principle of the invention.

Referring now to the drawings wherein like reference numerals designate like or corresponding parts throughout the several views, there is shown in FIG. 1 a top indicator 10, a middle indicator 12 and a bottom indicator 14, the bottom edge of the top indicator being used as a guide for alignment with the top of a waveform 16 presented on a display 17, the top edge of the bottom indicator 14 being used as a guide for alignment with the bottom of the waveform 16 and the top edge of the middle indicator 12 being used as a guide for indicating the mean height of the waveform. The top, middle and bottom indicators are made of a transparent material such as clear plastic and are mounted on carriages 18, 20 and 22 respectively. The carriages are mounted on worms 24 and 26 with the top edge of the middle indicator 12 centered between the bottom edge of the top indicator 10 and the top edge of the bottom indicator 14. In order to clearly distinguish the guiding edges of the indicators, these edges can be colored slightly or tapered so as to give a pointing effect.

As shown in FIG. 2 the carriage 22 has a worm gear 27 mounted in a recess within the carriage 22 in such a way that a portion of the teeth of the worm gear mesh with the teeth of the worm 24. The worm gear 27 is fixedly mounted on the carriage 22 by bolts 28 which extend through washers 30, the bolts being threaded into the worm gear 27 and the body of the carriage 22 so that the gear 27 will not rotate. The carriage 22 has upper and bottom holes 32 which are of such a size so as to slightly engage the outer periphery of the worms 24 and 26 and act as guides for the movement of the carriage 22. Accordingly, when the upper worm 24 is rotated the carriage 22 will follow thereon by the operation between the worm 24 and the worm gear 27 and when the bottom worm 26 is rotated there will be no movement whatsoever of the carriage 22.

The carriage 18 is identical to the carriage 22 except that it has a worm gear 27a engaging the bottom worm 26 rather than the top worm 24. The carriage 18 will move along the worm 26 upon the rotation thereof and will remain stationary upon the rotation of the worm 24. Accordingly, the carriage 22 and the indicator 14 are responsive only to the rotation of the worm 24 and the carriage 18 and the indicator 10 are responsive only to the movement of the worm 26.

The carriage 20, as shown in FIG. 4, has a worm gear 36 which meshes with both of the worms 24 and 26. The worm gear 36 is rotatably mounted in side plates 38 and 39 of the carriage by a pin 40, the worm gear having a slide bearing 42 such as a bronze oil type for rotation about the pin 40. The pin 40 has reduced portions 44 fixed in place within recesses of the side plates 38 and 39, this fixing being accomplished by any suitable means such as a force fit. On each side of the worm gear 36 are washers 46, these washers positioning the worm gear 36 so that it will at all times remain in mesh with the worms 24 and 26. Top and bottom members 48 and 50 have openings 52 of such a size so as to slightly engage the outer peripheries of the worms 24 and 26. The top and bottom members 48 and 50 are fixedly attached to the side plates 38 by any suitable means such as spot welding, a force fit or bolting.

Accordingly, the carriage 20 and the indicator 12 which is integral therewith are responsive to the rotation of either worm 24 or 26 giving rise to a differential action. This action can best be explained by reference to FIG. 5 which shows the worms 24 and 26 and the worm gear 36 along with an actual speed diagram of the worm gear 36 when one of the worms is rotated while the other worm is held stationary. Assuming that the top worm 24 is rotated while the bottom worm 26 is maintained in a stationary state it can readily be seen that the carriage 22 will have a speed along the worm 24 as represented by a leg 54 of the speed diagram whereas the translational speed of the worm gear 36 and likewise the carriage 20 along the worm 24 will be equal to just one half of the speed of the carriage 22, the speed of the carriage 20 being represented by a leg 56 of the smaller triangle. The reason that the carriage 20 will move at one half the speed of the carriage 22 along the worm 24 is because of the walking action of the worm gear 36 on the worm 26 as the worm 24 is rotated. The action of the carriage 18 with respect to the carriage 20 upon the rotation of the worm gear 26 and keeping the worm 24 stationary will be the same as that for the carriage 22 with respect to the carriage 20 as described above. Accordingly, upon the rotation of either worm 24 or 26 the end carriages 22 or 18 respectively will move at twice the speed of the middle carriage 20 so as to always maintain the middle indicator 12 centered between the indicators 10 and 14. It should be noted however, that should an operator rotate both of the worms 24 and 26 simultaneously that the differential action between the worm gear 36 and the worms 24 and 26 will likewise maintain the indicator 12 in a centered position.

Each of the worms 24 and 26 is necked down and rotatably mounted in fixed members 58 and 60, the upper end of the worm 24 as shown in FIG. 1 being rotatably mounted in the member 58 by a bearing 62 and the lower end of the worm 24 being rotatably mounted in the base member 60 by a bearing 64. The other worm 26 is mounted in the base member 58 and 60 in the same manner as that described for the worm 24. The worm 24, after it passes through the base member 60, has mounted thereon by a force fit a spur gear 66. In a like manner the other worm 26 has mounted thereon by a force fit a spur gear 68. Crossed helical gears 70 and 72 are in mesh with the spur gears 66 and 68 respectively. The crossed helical gears 70 and 72 are force fitted on shafts 78 and 80 respectively with the shafts 78 and 80 being rotatably mounted in another base member not shown. Fixedly attached to the shafts 78 and 80 are knobs 82 and 84 respectively so that upon an operator turning knob 82 carriages 22 and 20 will be moved along the worms and upon the operator turning knob 84 the carriages 18 and 20 will be moved along the worms.

Adjacent the indicators 10, 12 and 14 and the waveform 16 is a scale 86 having graduations between apertures 88. By a means (not shown) the depth of the submarine at each of the apertures 88 is shown through the apertures and is used in conjunction with the graduations to determine the exact depth of the submarine with respect to the mean height of the waveform 16.

In the operation of the device the operator will rotate the knobs 82 and 84 until the top indicator 10 is aligned with the top of the waveform and the bottom indicator 14 is aligned with the bottom of the waveform after which he will read across from the indicator 12 on the scale 86 to read the depth of the submarine with respect to the mean height of the waveform 16. The operator may align the indicators 10 and 14 separately or simultaneously. Practically speaking the best procedure for one operator would be to perform the alignment separately which would mean that the operator would first align, for instance, the top indicator 10 on top of the waveform and then follow with the alignment of the indicator 14 with the bottom of the waveform.

It is now readily apparent that the invention provides a simple gearing arrangement for automatically positioning a middle indicator so as to find the mean height of the waveform upon alignment of a top and bottom indicator with the top and bottom of the waveform respectively. The result is that an operator need at the most make two simple alignment operations, after which he can obtain his answer without the necessity of performing many steps of alternatively spacing and aligning the indicators separately until both indicators are aligned as is required by prior devices.

Obviously many modifications and variations of the present invention are possible in the light of the above teachings. For instance, the carriages and the indicators could be moved along any path except a path perpendicular to the plane of the waveform. Accordingly, it is only required that the longitudinal axes of the worms 24 and 26 have a projection other than a point in the plane of the waveform 16. It is therefore to be understood, that within the scope of the appended claims, the invention may be practiced otherwise than as specifically described.

We claim:

1. An apparatus for automatically indicating the mean height of a waveform presented in a particular plane, said apparatus comprising a base, a pair of elongate worms mounted on said base with their axes in parallel relationship with respect to each other and to the said plane, at least one of the worms being rotatably mounted on said base, a pair of indicators lying in a plane parallel to said plane and designed for alignment with the uppermost and lowermost extremities of said waveform, a center pointer positioned midway between said pair of indicators, means meshing with the threads of the rotatable worm and supporting one of the said indicators for moving the said one indicator along a path parallel to the worm upon rotation of the latter, means mounted on the other worm and supporting the other said indicator, and means, including a worm gear, meshing with both of said worms and supporting the center pointer for moving the latter along a path parallel to the worms at half the speed of movement of said one indicator, whereby, upon independent rotation of the worms until the said indicators are respectively aligned with the uppermost and the lowermost extremities of said waveform, the center pointer will be positioned midway between such extremities.

2. An apparatus as claimed in claim 1 wherein said other worm is also rotatably mounted on the base, and said means mounted on the other worm meshes with the other worm so that upon rotation thereof the other said indicator will move therealong.

3. An apparatus for automatically indicating the mean height of a waveform presented in a particular plane, said apparatus comprising a base, a pair of elongate worms rotatably mounted on said base with their axes in parallel relationship with respect to each other and to the said plane, a top indicator, a bottom indicator and a center pointer positioned midway between the top and bottom indicators, means meshing with the threads of one of said worms and supporting said top indicator for moving the latter along a path parallel to the worm upon rotation thereof, further means meshing with the threads of the other worm and supporting the bottom indicator for moving the latter along a path parallel to the other worm upon rotation thereof, and means, including a worm gear meshing with the threads of both worms and supporting the center pointer, for moving the latter along a path parallel to the worms at half of the speed of the movement of either of the top or bottom indicators upon a selective rotation of one of the worms, whereby, upon aligning the top and bottom indicators with the top and bottom of the waveform, the center pointer will be aligned with the mean height of the waveform.

4. An apparatus as claimed in claim 3 wherein each of the indicators are in the form of a straight line guide, the straight line guides being aligned parallel with one another and positioned in a plane parallel to the axis of said worms.

5. An apparatus as claimed in claim 3 wherein said waveform represents the envelope of a seawave condition above a submarine, and said apparatus further includes a graduated scale adjacent to said indicators and said pointer, said scale extending along a path which is parallel to said worms, whereby, in conjunction with depth indicia of the submarine represented to said scale, the depth of the submarine with respect to the mean height of the said seawave can be determined.

References Cited in the file of this patent

UNITED STATES PATENTS

| | | |
|---|---|---|
| 2,291,552 | Lalonde | July 28, 1942 |
| 2,770,046 | Wichmann | Nov. 13, 1956 |